United States Patent [19]
Kemp

[11] Patent Number: 4,911,408
[45] Date of Patent: Mar. 27, 1990

[54] SEAT ASSEMBLY FOR BALL VALVES

[75] Inventor: Willard E. Kemp, Houston, Tex.

[73] Assignee: Kemp Development Corporation, Houston, Tex.

[21] Appl. No.: 292,993

[22] Filed: Jan. 3, 1989

[51] Int. Cl.4 ............................................ F16K 5/06
[52] U.S. Cl. .................... 251/174; 251/214; 251/315
[58] Field of Search ............... 251/170, 172, 174, 214, 251/315

[56] References Cited

U.S. PATENT DOCUMENTS

| | | |
|---|---|---|
| 2,825,527 | 3/1958 | Wendell. |
| 2,916,254 | 12/1959 | Wendell. |
| 3,067,977 | 12/1962 | Anderson et al.. |
| 3,211,421 | 10/1965 | Johnson et al.. |
| 3,542,054 | 11/1970 | Works. |
| 4,071,041 | 1/1978 | Moran, Jr. et al.. |
| 4,085,770 | 4/1978 | Wononowicz. |
| 4,290,581 | 9/1981 | Moran et al. ............... 251/172 |
| 4,292,989 | 10/1981 | Cozzanigo et al. ......... 251/174 X |
| 4,318,420 | 3/1982 | Calvert ....................... 251/174 X |
| 4,332,267 | 6/1982 | Evans ......................... 251/174 X |
| 4,477,055 | 10/1984 | Partridge. |
| 4,519,412 | 5/1985 | Grazioli ...................... 251/174 X |
| 4,696,523 | 9/1987 | Iff ............................... 251/315 X |

FOREIGN PATENT DOCUMENTS 857737 12/1977 Canada.

Primary Examiner—John Fox
Attorney, Agent, or Firm—Dodge, Bush & Moseley

[57] ABSTRACT

A top entry ball valve (10) has a removable top plate (34) to permit the removal of a ball valve member (80). Valve seat assemblies (98, 100) each include a primary metal seat member (102), a concentric secondary elastomeric seat member (104), and a concentric rigid seat retainer 106. The primary metal seal member (104) has a free end portion (108) of a reduced thickness to engage the ball member (80) closely adjacent the bore (82). The valve ball member (80) is mounted for rotation on a lower trunnion (28) of the valve body (12) and an upper trunnion (40) of the top plate (34). A packing (70) about the stem (48) has a downward force exerted thereagainst by Belleville springs (74, 75) that is greater than the maximum internal pressure of the valve (10).

19 Claims, 3 Drawing Sheets

SEAT ASSEMBLY FOR BALL VALVES

BACKGROUND OF THE INVENTION

This invention relates to spherical plug or ball valves, and more particularly to an improved seat assembly for sealing against the rotatable ball valve member of the ball valve.

Heretofore, ball valves have been provided with rotatable ball valve members mounted within a valve chamber and rotatable between open and closed positions relative to inlet and outlet flow passages communicating with the valve chamber. Further, so-called top entry ball valves have been provided in which a removable top plate covers the valve chamber and is removed for insertion and removal of the ball valve member from the valve chamber. Normally, a valve seat assembly is positioned about each flow passage for sealing against the ball valve member, and the seat assembly is urged to a retracted position when the ball valve member is inserted or removed from the valve chamber.

Such seat assemblies, particularly for top entry ball valves, have normally been provided with elastomeric seat members for sealing against the ball valve member. As well known, an elastomeric seat member will deteriorate at high temperatures above around 300° F. and permit fluid leakage between the inlet and outlet flow passages in the closed position of the ball valve member. For example U.S. Pat. No. 4,477,055 dated Oct. 16, 1984 shows a top entry ball valve having a ball valve member mounted for rotation on trunnions and a retractable seat assembly with an elastomeric sealing member for sealing against the ball valve member.

SUMMARY OF THE INVENTION

The present invention is particularly directed to a so-called fire safe ball valve which maintains a sealing relation at high temperatures over around 500° F. The ball valve includes a ball valve member mounted on opposed trunnions in a valve chamber for rotation between open and closed positions relative to opposed inlet and outlet flow passages communicating with the valve chamber. An annular valve seat assembly is positioned about each flow passage for sealing against the ball valve member. Each seat assembly has an inner primary metal seat member positioned closely adjacent the central bore in the ball valve member in the open position thereof for sealing thereagainst, and an outer secondary elastomeric seat member positioned radially outward of the primary metal seat member. In the event of fire or the like generating high temperatures, the metal seat member maintains its sealing relation even upon the deterioration or destruction of the elastomeric seat member.

The improved seat assembly is particularly adapted for use with top entry ball valves and is movable to a retracted position to permit removal or insertion of a ball valve member. The primary metal seat member is urged into sealing relation with the ball valve member by resilient spring means and by fluid pressure from the adjacent flow passage. Thus, in the closed position of the ball valve member, the downstream seat assembly is urged by the downstream fluid pressure into sealing engagement and the higher the downstream fluid pressure, the higher the sealing force exerted by the downstream seat assembly against the ball valve member.

Another feature includes means for exerting a compressive loading inwardly against the packing material about the stem that is greater under all conditions of operation than the internal fluid pressure of the valve acting outwardly against the packing. Thus, the packing will not tend to move outwardly under the maximum internal fluid pressure of the valve. The means for exerting the compressive loading on the packing comprises a relatively large diameter Belleville spring about the stem biased between a follower engaging the packing and the stem housing.

It is an object of the present invention to provide an improved annular seat assembly for a ball valve including an inner primary metal seat member and an outer secondary elastomeric seat member radially outward of the primary seat member.

It is a further object of this invention to provide such an improved annular seat assembly for a top entry ball valve with the seat assembly mounted for movement to a retracted position to permit removal and insertion of a ball valve member in the valve chamber.

An additional object of the invention is to provide a top entry ball valve having a ball valve member mounted for rotation on opposed trunnions and a packing about a stem received by a trunnion with the packing having an inward compressive force exerted against it which is greater at all times than the maximum internal fluid pressure of the valve.

Various other objects, advantages and features of this invention will become apparent to those skilled in the art from the following description taken in conjunction with the accompanying drawings.

DETAILED DESCRIPTION

Figure 1:
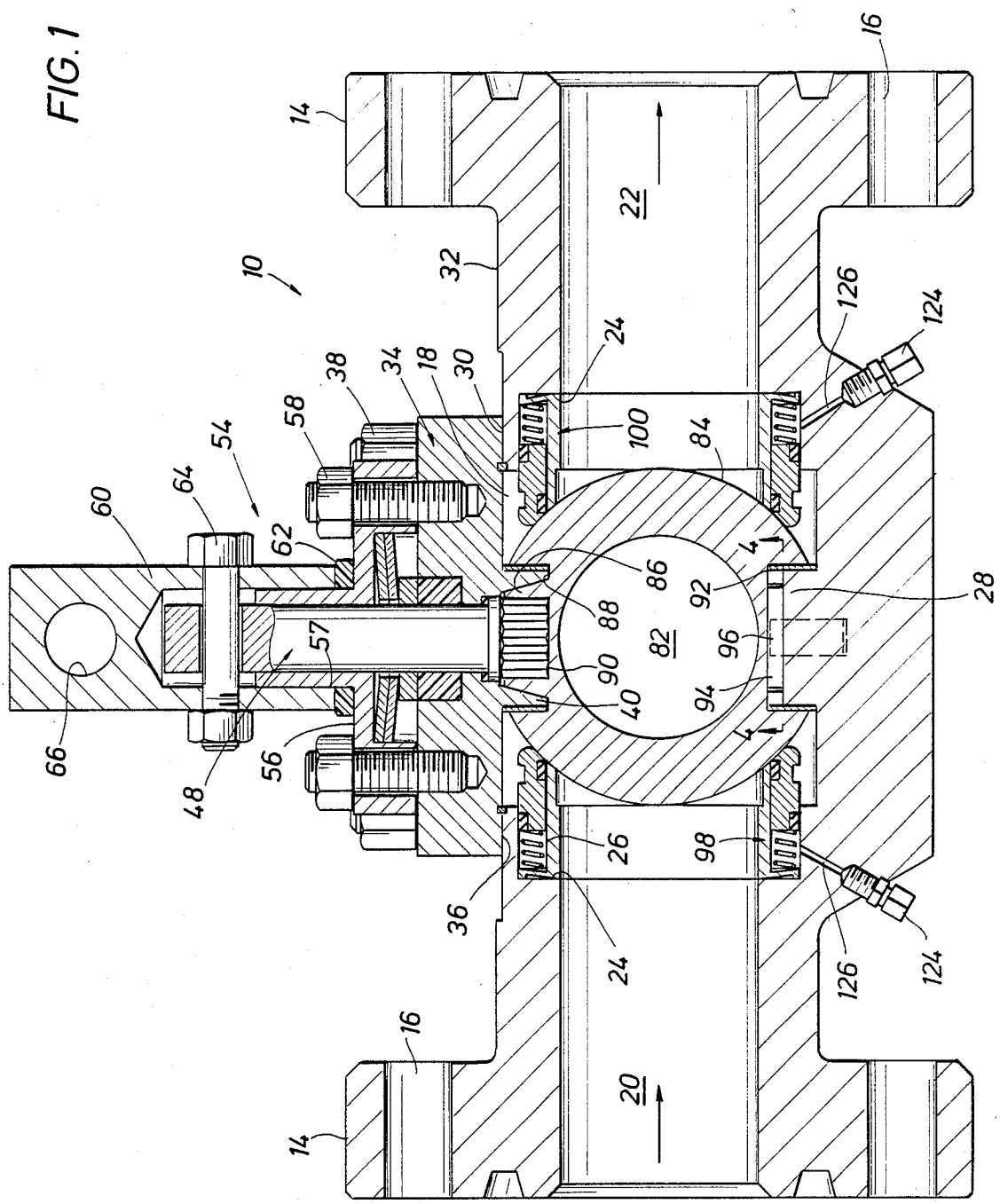
FIG. 1 is a longitudinal sectional view of the present invention comprising a top entry ball valve having a ball valve member rotatable between open and closed positions and upstream and downstream valve seat assemblies engaging the ball valve member in sealing relation.
Figure 2:
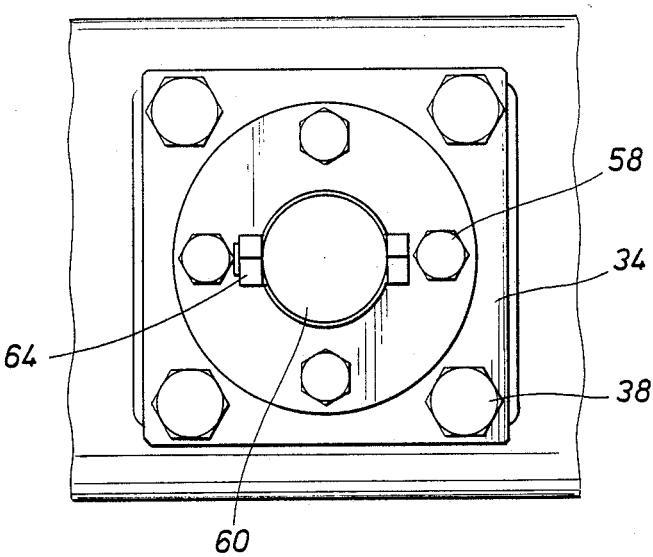
FIG. 2 is a partial top plan of the ball valve illustrated in FIG. 1.

Referring now to the drawings for a better understanding of the invention, a ball valve structure is generally indicated at 10 having a valve body 12 with opposed end flanges 14 having bolt openings 16 for mounting ball valve 10 within a flow line by suitable nut and nut combinations (not shown). Body 12 has a valve chamber 18. An inlet flow passage 20 and an outlet flow passage 22 are in fluid communication with valve chamber 18. Annular recesses formed at the juncture of flow passages 20 and 22 with valve chamber 18 define annular shoulders or abutments 24 and enlarged diameter cylindrical surface 26 extending perpendicularly to shoulders 24.

Valve body 12 has a lower trunnion 28 extending upwardly into valve chamber 18. Body 12 defines an annular upper surface 30 about chamber 18 adjacent the outer surface of body 12 shown at 32.

Figure 3:
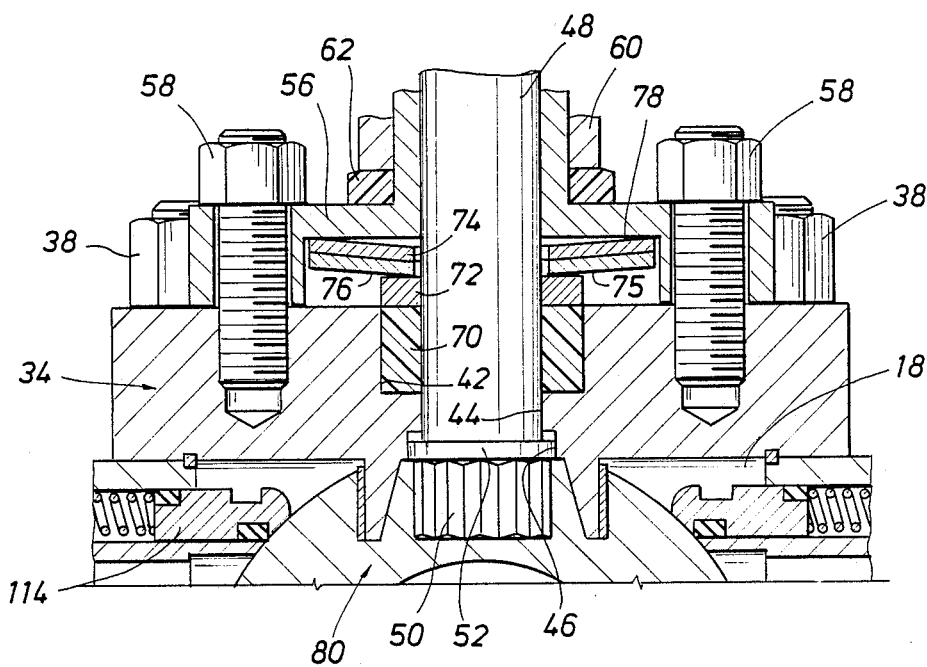
FIG. 3 is an enlarged fragment of FIG. 1 showing the bonnet assembly in enlarged relation including the spring loading for the packing about the valve stem.

A top plate shown generally at 34 has a lower annular surface 36 fitting against annular surface 30 and connected to valve body 12 by suitable nut and bolt combinations shown generally at 38. A lower annular projection 40 of top plate 34 extends inwardly into valve chamber 18 from the lower surface of top plate 34. Top plate 34 has a central bore therein surrounding at its lower end by annular projection 40 and defining an enlarged diameter outer bore portion 42, a small diameter intermediate bore portion 44, and an intermediate diameter inner bore portion 46 as shown particularly in FIG. 3.

A stem 48 has a splined inner end 50 and an adjacent annular flange 52 which fits within inner bore portion 46. A stem housing or bonnet is generally indicated at 54 and includes a lower flanged portion 56 having an annular extension 57 and connected by suitable nut and bolt combinations 58 to top plate 34. An upper cap 60 of bonnet 54 extends above extension 57 of flanged portion 56 and is mounted for rotation about extension 57. An elastomeric seal 62 is positioned between cap 60 and flanged portion 56. Cap 60 receives the outer extending end of stem 58 and is secured thereto for rotation of stem 48 by nut and bolt combination 64. A suitable handle (not shown) is mounted through an opening 66 in cap 60 for manual rotation of stem 48. It is understood, if desired, that other means might be provided to rotate cap 60 and stem 48, such as various types of mechanical or electrical operators, for example.

Lower flanged portion 56 of stem housing 54 has an inner recess or pocket 68 adjacent the upper surface of top plate 34. A packing material 70 is positioned within outer bore portion 42 about stem 48 and a follower 72 extending within pocket 68 is positioned about stem 48 in contact with the upper surface of packing material 70. A pair of Belleville springs 74,75 are received within pocket 68 about stem 48 and are of a relatively large outer diameter at least twice the diameter of shaft 48. An inner marginal portion 76 of Belleville springs 74 is positioned over follower 72 with lower Belleville spring 75 in contact with the upper surface of follower 72. An outer marginal portion 78 of Belleville springs 74,75 is biased downwardly by contact with the inner surface of flanged portion 56. The inner force against follower 72 exerted by Belleville springs 74,75 is of a magnitude greater than the maximum opposing force resulting from internal fluid pressure of valve 10 thereby to exert a downward force or loading against packing 70 under all operating conditions.

Figure 4:
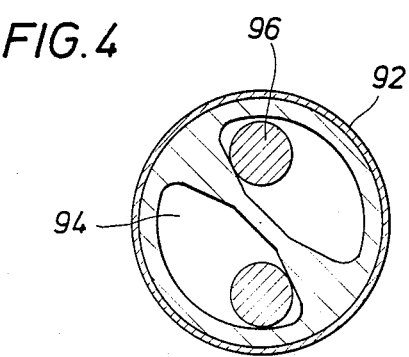
FIG. 4 is a section taken generally along line 4—4 of FIG. 1.
Figure 5:
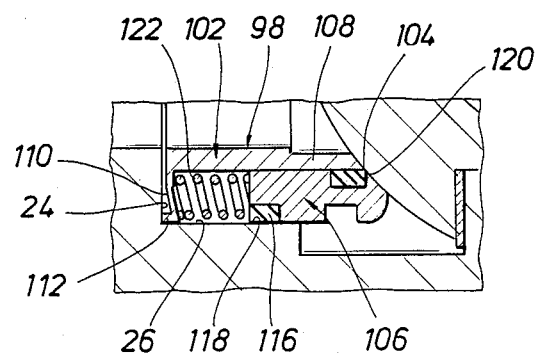
FIG. 5 is an enlarged sectional view of the valve seat assembly shown in FIG. 1 illustrating the inner primary metal seat member and the outer secondary elastomeric seat member.
Figure 6:
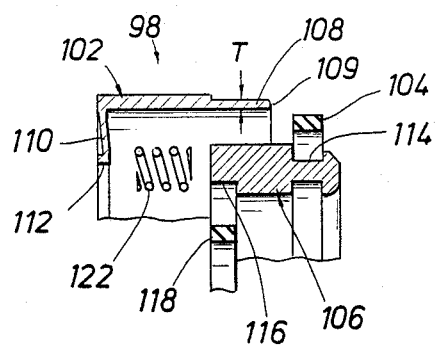
FIG. 6 is an exploded view of the valve seat assembly shown in FIG. 5.

A ball valve member is generally designated 80 and has a central bore 82 therethrough providing a flow passage for communicating with and forming a smooth continuation of inlet flow passage 20 and outlet flow passage 22 when in an open position. Ball member 80 has a generally spherical outer surface 84 and a tapered or arcuate nose surface is formed at the juncture of bore 82 and spherical surface 84. An upper trunnion 86 on ball valve member 80 defines an adjacent annular groove 88 for receiving flange 40 of top plate 34 therein. A splined opening 90 in ball valve member 80 receives splined end 50 of stem 48 in mating relation for rotation of ball member 80 upon rotation of stem 48. It is noted that only torsional loads or forces are transmitted between stem 48 and ball valve member 80 as end thrust loadings or the like exerted against ball valve member 80 are exerted against trunnion 40 and not against stem 48 thereby effecting a smooth rotational action of stem 48. The lower end of ball valve member 80 has an annular recess 92 therein receiving body trunnion 28 and a pair of arcuate slots 94 are defined by recess 92 as shown in FIG. 4. A pair of fixed stop pins 96 extend from trunnion 28 and are received within slots 94 for stopping the rotation of ball valve member 80 at fully open and fully closed positions.

Mounted in the recesses defined by shoulders 24 and enlarged circumferential portions 26 are an upstream valve seat assembly generally designated 98 and a downstream seat assembly generally indicated 100. Seat assemblies 98 and 100 are generally identical and for the purposes of illustration only upstream seat assembly 98 will be described in detail as it is understood that downstream seat assembly 100 is identical and like reference characters will be provided. Valve seat assembly 98 comprises an inner primary metal seat member generally indicated 102, an outer secondary elastomeric seat member indicated at 104, and a generally rigid retainer ring generally indicated 106. Seat members 102, 104 and rigid retainer ring 106 are in concentric relation to each other.

Figure 8:
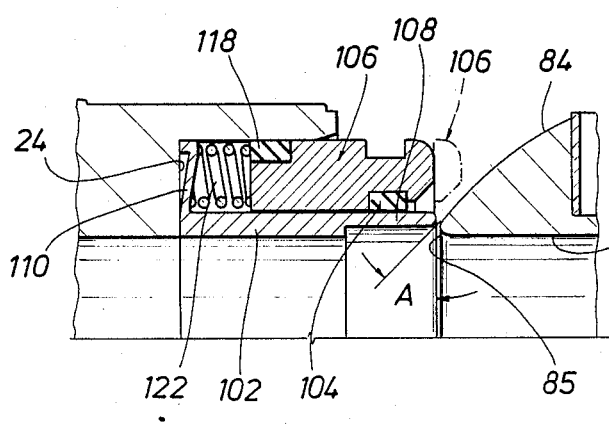
FIG. 8 is an enlarged section of the valve seat assembly in the retracted position of FIG. 7.

Primary metal seat member 102 has an extended free forward end portion or lip 108 of a reduced thickness with a tapered end 109 positioned in engagement with spherical surface 84 of ball valve member 80 at annular nose surface 85 at the juncture of bore 82 and spherical surface 84. End 109 preferably contacts spherical surface 84 at an angle A of around 45° with respect to a tangent at the contact point on spherical surface as shown in FIG. 8. End portion 108 is substantially more flexible in a radial direction than rigid retainer ring 106 for maintaining metal-to-metal sealing contact with spherical surface 84. The thickness T of end portion 108 in order to provide the desired flexibility is preferably around 0.020 inch per inch of bore diameter of ball valve member 80. However, satisfactory results may be obtained with thickness T being between 0.005 inch and 0.050 inch per inch of bore diameter.

Figure 7:
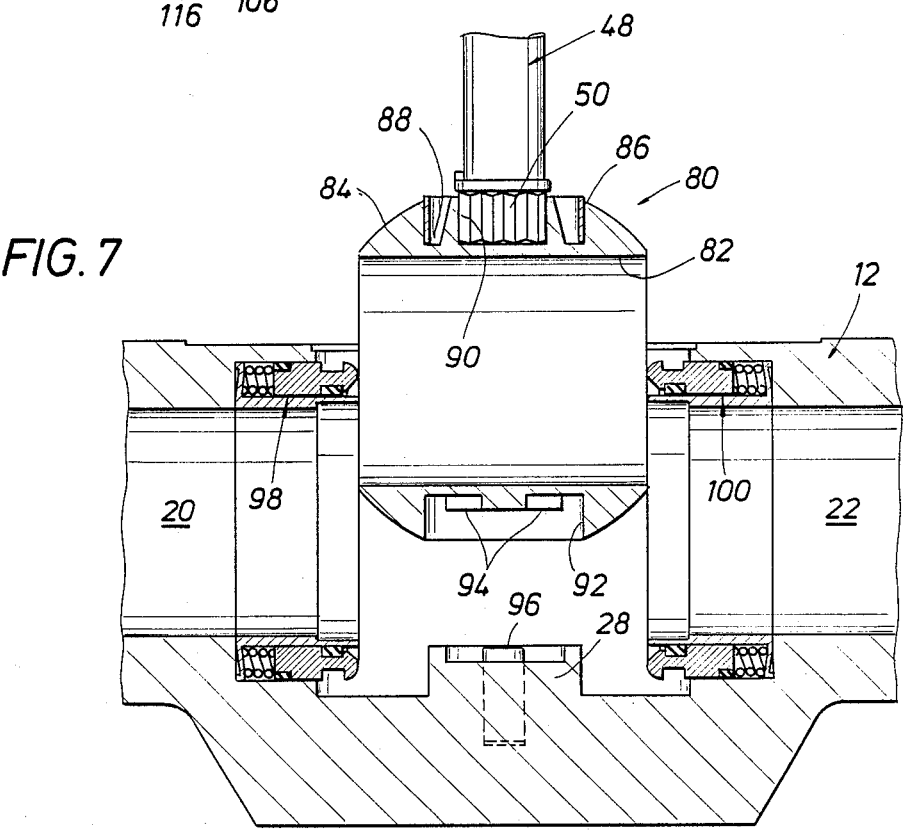
FIG. 7 is an enlarged fragment of FIG. 1 showing a ball valve member being removed from the valve chamber with the valve seat assemblies in a retracted position and the top plate removed from the valve body.

Also, in order to provide sufficient sealing force against spherical surface 84, an interface force of around 700 pounds per linear inch of annular sealing surface is required at zero or lower pressure within the flow line. In order to achieve such a loading, a high strength material, such as titanium, having a modulus of elasticity of around seventeen million (17,000,000) has been found to be satisfactory for forming metal seat member 102. Seat retainer ring 106 has a modulus of elasticity of around twenty-nine million (29,000,000). It is also desirable, especially for removal of ball valve member 80 from body 12 as shown in FIG. 7, that seat assemblies 98,100, and particularly primary seat member 102, retract a minimal amount for such removal. For example, seat member 102 preferably retracts an amount around 0.020 inch. Thus, it is desirable that tapered end 109 contact ball valve member 80 at tapered nose surface 85 as close to bore 82 as possible in order to minimize such retraction of the associated seat assembly for removal of valve ball member 80.

Primary metal seat member 102 has a rear end or face 110 which is spaced from adjacent shoulder 24 of the recess by an outer lip 112 fitting against the corner of the recess. Thus, fluid pressure from inlet flow passage 20 is exerted against rear face 110 for urging primary metal seat member 102 into engagement with spherical surface 84.

Rigid retainer ring 106 has an inner annular groove 114 receiving secondary elastomeric seat member 104 and an outer annular groove 116 receiving an elastomeric O-ring 118 for sealing between retainer ring 106 and adjacent circumferential surface 26. The forward end 120 of retainer ring 106 is continuously urged against spherical surface 84 by a compression spring 122 biased between the rear end of retainer ring 106 and the rear end portion 110 of primary metal seat member 102. Elastomeric seat member 104 carried by retainer ring 106 is likewise urged by compression spring 122 into sealing engagement with ball valve member 80.

Upon a relatively high fluid pressure exerted from inlet flow passage 20, fluid pressure acting against rear end portion 110 urges end 109 of lip 108 into tight metal to metal sealing relation with adjacent spherical surface 84 of ball valve member 80. The flexibility of lip 108 and beveled end 109 which engages spherical surface 84 at an angle A of around 45° with respect to a tangent at the contacting spherical surface 44 tends to insure the tight metal to metal sealing relation about the entire valve bore 82.

For lubrication, a lubrication plug is shown in broken lines at 124 on FIG. 1 and a lubrication port 116 leading to the area occupied by spring 122 provides lubricant to leak between retainer ring 106 and primary metal seat member 102 to elastomeric seat member 104 and lip 108 thereby to distribute lubricant around the sealing contact surface of ball valve member 80.

Elastomeric seat member 104 is effective to provide a fluid tight sealing relation with the spherical surface 84 of ball valve member 80 under normal operating conditions. In the event of fire or the like generating a very high temperature which might deteriorate elastomeric seat member 104, primary seat member 102 will maintain sealing relation with ball valve member 80.

Referring particularly to FIGS. 7 and 8 in which ball valve member 80 is shown being removed from valve chamber 18 after top plate 34 is removed, it is noted that the primary metal seat member 102 requires only a minimal retraction since it is positioned closely adjacent the juncture of bore 82 with spherical surface 84. Retainer ring 106 may be retracted a substantial distance relative to primary seat member 102 upon compression of spring 122. It is noted that upon rotation of ball valve member 80 to closed position from an open position that valve chamber 18 is exposed to inlet fluid pressure which might leak against the lower end of packing 70. However, since follower 72 is continuously exerting a downward compressive force against packing 70 which is designed to be greater than the maximum inlet fluid pressure of valve 10, a continual downward loading of packing 70 is provided and eliminates any possible oscillation of packing 70. Likewise, no creep or cold flow occurs in packing 70 since a live load is applied against packing 70 at all times.

Figure 9:
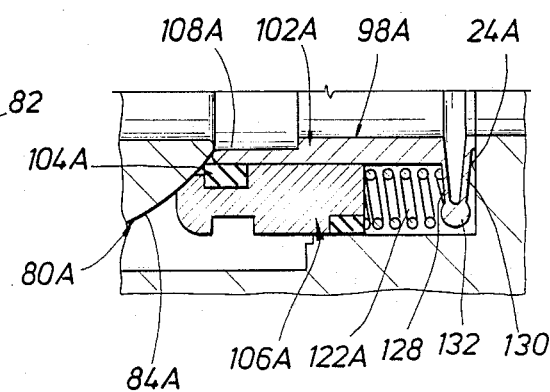
FIG. 9 a fragmentary sectional view of a modified valve seat assembly for sealing against a ball valve member.

Referring now to FIG. 9, a modified valve seat assembly 98A is shown which is identical to valve seat assembly 98 except in regard to the primary metal seat member. Metal seat member 102A has at its rear end a pair of legs 128 and 130 hinged to each other about hinge 132 positioned adjacent a corner of the annular recess. Leg 130 is in contact with adjacent shoulder 24A. Compression spring 122A is biased between leg 128 and the rear end of retainer ring 106A for urging elastomeric seat member 104A and retainer ring 106A into engagement with valve ball member 80A. Fluid pressure from the adjacent flow passage is received between legs 128 and 130 for urging lip 108A into sealing engagement with spherical surface 84A of valve ball member 80A.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A top entry ball valve comprising:
   a valve body having a valve chamber therein and opposed inlet and outlet flow passages in fluid communication with the valve chamber;
   a top plate removably mounted on the valve body over the valve chamber to provide access to the valve chamber when removed;
   a spherical ball valve member having a central bore therethrough and mounted in said valve chamber for movement between open and closed positions relative to said flow passages, said ball valve member being insertable within and removable from said valve chamber upon removal of said top plate;
   an operating stem connected to said ball valve member and extending through said top plate;
   means connected to the extending end of said operating stem for rotating said ball valve member between open and closed positions;
   an annular recess in said valve body at the juncture of the valve chamber with each of the flow passages;
   an annular valve seat assembly mounted in each of the annular recesses about the adjacent flow passage for sealing about the spherical surface of the valve member and blocking fluid flow between the inlet and outlet flow passages in the closed position of the ball valve member;
   each valve assembly including a primary annular metal seat member having an extending free end portion positioned closely adjacent the central bore in said ball valve member in the open position thereof for sealing against the ball valve member, a separate secondary elastomeric seat member spaced radially outward of said primary metal seat member and in concentric relation thereto for forming a fluid tight sealing relation with said ball valve member, and a separate generally rigid retainer ring for the elastomeric seat member positioned radially outwardly of said primary seat member and restraining outward radial movement of said primary metal seal member; and
   means to urge said metal seal member continuously into sealing contact with said ball valve member.

2. The top entry ball valve as set forth in claim 1 wherein said top plate has a bore therethrough receiving said stem including an inner small diameter bore portion adjacent said valve member and an outer large diameter bore portion;

a packing within said large diameter bore portion about said stem;

a follower at said large diameter bore portion adjacent said packing; and resilient spring means urging said follower against said packing for compressing said packing.

3. A top entry ball valve as set forth in claim 3 wherein said extending free end portion defines a lip of a reduced thickness to permit flexing of said lip upon engagement with said ball valve member for effecting a tight metal-to-metal sealing relation.

4. The top entry ball valve as set forth in claim 3 wherein fluid pressure from said inlet fluid passage urges said primary metal seat member into sealing engagement.

5. The top entry ball valve as set forth in claim 5 wherein said generally rigid retaining ring has an annular groove therein securing said elastomeric seat member.

6. A top entry ball valve comprising:

a valve body having a valve chamber thereon and opposed inlet and outlet flow passages in fluid communication with the valve chamber;

a top plate removably mounted on the valve body over the valve chamber to provide access to the valve chamber when removed;

a spherical ball valve member having a central bore therethrough and mounted in said valve chamber for movement between open and closed positions relative to said flow passages, said ball valve member being insertable within and removable from said valve chamber upon removal of said top plate;

an operating stem connected to said ball valve member and extending through said top plate;

means connected to the extending end of said operating stem for rotating said ball valve member between open and closed positions;

an annular recess in said valve body at the juncture of the valve chamber with each of the flow passages;

an annular valve seat assembly mounted in each of the annular recesses about the adjacent flow passage for sealing about the spherical surface of the valve member and blocking fluid flow between the inlet and outlet flow passages in the closed position of the ball valve member, each seat assembly including an inner primary metal seat member, and an outer retainer ring positioned radially outwardly of said primary seat member for restraining outward radial movement of said primary seat member;

said primary metal seat member having an extending free end portion adjacent said ball valve member for flexing and sealing tightly against said ball valve member; and resilient means for urging continuously said primary seat member into sealing contact with said ball valve member.

7. A top entry ball valve as set forth in claim 6 wherein additional resilient means urge said retainer ring into sealing engagement with said ball valve member.

8. A top entry ball valve as set forth in claim 6 wherein fluid pressure from said adjacent flow passage urges said primary metal seat member into sealing engagement with said ball valve member.

9. A top entry ball valve comprising:

a valve body having a valve chamber therein and opposed inlet and outlet flow passages in fluid communication with the valve chamber;

a top plate removably mounted on the valve body over the valve chamber to provide access to the valve chamber when removed;

a spherical ball valve member having a central bore therethrough and mounted in said valve chamber for movement between open and closed positions relative to said flow passages, said ball valve member being insertable within and removable from said valve chamber upon removal of said top plate;

an operating stem connected to said ball valve member and extending through said top plate;

means connected to the extending end of said operating stem for rotating said ball valve member between open and closed positions;

said top plate having a bore therethrough receiving said stem including an inner small diameter bore portion adjacent said valve member and an outer large diameter bore portion;

a stem housing removably mounted on said top plate for receiving the extending end of said stem, said stem housing having a recessed portion adjacent said top plate;

an expandable packing within said large diameter bore portion of said plate extending about said stem;

a follower fitting against the outer end of said packing and extending outwardly from said large diameter bore portion; and a Belleville spring received within said recessed portion of said stem housing having an annular radially inner portion engaging said follower and an annular radially outer portion engaging said stem housing for exerting a force on said follower for compression of said packing about said stem.

10. A top entry ball valve as set forth in claim 9 wherein said Belleville spring exerts a force against said follower which is greater under all operating conditions than the internal fluid pressure of the valve whereby said packing is urged inwardly under all operating conditions.

11. A top entry ball valve as set forth in claim 10 whereby a plurality of Belleville springs are provided within said recessed portion adjacent said follower for exerting a force thereupon.

12. A top entry ball valve as set forth in claim 10 wherein the outer diameter of said Belleville spring is at least around twice the diameter of said shaft.

13. A top entry ball valve comprising:

a valve body having a valve chamber therein and a lower trunnion projecting into the valve chamber;

a top plate mounted on the valve body over the valve chamber and having an upper trunnion thereon extending into the valve chamber;

a spherical ball valve member having a central bore therethrough and upper and lower trunnions thereon within the confines of the outer spherical surface of the ball valve member and cooperating with said lower trunnion of the body and said upper trunnion of the top plate for mounting said ball valve member for rotation between open and closed positions;

an operating stem extending through the top plate and having its lower end received within an opening formed by the trunnion on the ball valve member and fixed against rotation relative to the ball valve member;

a stem housing mounted on said top plate for receiving the extending end of said stem and having a recessed portion adjacent said top plate;

a packing carried by said top plate and extending about the stem; and resilient means received within said recessed portion of said stem housing exerting a compressive force on the outer end of the packing which is greater than the maximum internal fluid pressure of the valve member thereby to exert a downward compressive force against the packing under all conditions of operation.

14. A top entry ball valve as set forth in claim 13 wherein said means for exerting said downward force comprises a relatively large diameter Belleville spring.

15. A top entry ball valve as set forth in claim 13 wherein said top plate has a bore therethrough receiving said stem and including an outer large diameter bore portion receiving said packing therein; and a spring urged follower fitting against the outer end of said packing for exerting a downward force on said packing for radially expanding said packing into tight sealing relation.

16. A top entry ball valve comprising:
a valve body having a valve chamber thereon and opposed inlet and outlet flow passages in fluid communication with the valve chamber;
a top plate removably mounted on the valve body over the valve chamber to provide access to the valve chamber when removed;
a spherical ball valve member having a central bore therethrough and mounted in said valve chamber for movement between open and closed positions relative to said flow passages, said ball valve member being insertable within and removable from said valve chamber upon removal of said top plate;
an operating stem connected to said ball valve member and extending through said top plate;
means connected to the extending end of said operating stem for rotating said ball valve member between open and closed positions;
an annular recess in said valve body at the juncture of the valve chamber with each of the flow passages;
an annular valve seat assembly mounted in each of the annular recesses about the adjacent flow passage for sealing about the spherical surface of the valve member and blocking fluid flow between the inlet and outlet flow passages in the closed position of the ball valve member;
each valve assembly including a primary annular metal seat member positioned closely adjacent the central bore in said ball valve member in the open position thereof for sealing against the ball valve member;
means to urge said metal seal member into sealing contact with said ball valve member;
said top plate having a bore therethrough receiving said stem including an inner small diameter bore portion adjacent said valve member and an outer large diameter bore portion;
a packing within said large diameter bore portion about said stem;
a follower at said large diameter bore portion adjacent said packing;
resilient spring means urging said follower against said packing for compressing said packing; and
a stem housing removably mounted on said top plate for receiving the extending end of said stem, said stem housing having a recessed portion adjacent said top plate for receiving said resilient spring means and said follower.

17. A top entry ball valve as set forth in claim 16 wherein said resilient spring means comprises a Belleville spring secured within said recessed portion having an annular radially inner portion engaging said follower and an annular radially outer portion engaging said stem housing for exerting a force on said follower for compression of said packing.

18. A top entry ball valve comprising:
a valve body having a valve chamber thereon and opposed inlet and outlet flow passages in fluid communication with the valve chamber;
a top plate removably mounted on the valve body over the valve chamber to provide access to the valve chamber when removed;
a spherical ball valve member having a central bore therethrough and mounted in said valve chamber for movement between open and closed positions relative to said flow passages, said ball valve member being insertable within and removable from said valve chamber upon removal of said top plate;
an operating stem connected to said ball valve member and extending through said top plate;
means connected to the extending end of said operating stem for rotating said ball valve member between open and closed positions;
an annular recess in said valve body at the juncture of the valve chamber with each of the flow passages; and
an annular valve seat assembly mounted in each of the annular recesses about the adjacent flow passage for sealing about the spherical surface of the valve member and blocking fluid flow between the inlet and outlet flow passages in the closed position of the ball valve member each seat assembly including an inner primary metal seat member, and an outer retainer ring positioned radially outwardly of said primary seat member for restraining outward radial movement of said primary seat member;
said primary metal seat member having an extending free end portion adjacent said ball valve member of a reduced thickness between 0.005 inch and 0.020 inch for each inch of bore diameter for flexing and sealing tightly against said ball valve member;
said valve member having a generally spherical surface with the juncture of the central bore and spherical surface having a beveled annular nose surface, and said free end portion of said metal seat member having a beveled end engaging said annular nose surface in metal to metal sealing relation in open position.

19. A ball valve comprising:
a valve body having a valve chamber therein and opposed inlet and outlet flow passages in fluid communication with the valve chamber;
a ball valve member having a central bore therethrough and mounted in said valve chamber for movement between open and closed positions relative to said flow passages;
an operating stem connected to said valve member and extending through said valve body;

means connected to the extending end of said operating stem for movement of said valve member between open and closed positions;

said valve body having a bore therethrough receiving said stem including an inner small diameter bore portion adjacent said valve member and an outer large diameter bore portion;

a stem housing removably mounted on said valve body for receiving the extending end of said stem, said stem housing having a recessed portion adjacent said stem body;

an expandable packing within said large diameter bore portion of said valve body extending about said stem;

a follower fitting against the outer end of said packing and extending outwardly from said large diameter bore portion; and a Belleville spring of an outer diameter greater than the outer diameter of said packing received within said recessed portion of said stem housing, said Belleville spring having an annular radially inner portion engaging said follower and an annular radially outer portion engaging said stem housing for exerting a force on said follower for compression of said packing about said stem, said Belleville spring exerting a force against said follower which is greater than the internal operating fluid pressure of the valve whereby said packing is urged inwardly.

* * * * *